Nov. 22, 1949     L. DE FOREST     2,489,082
HIGH-VOLTAGE GENERATOR
Filed July 1, 1944     6 Sheets-Sheet 1
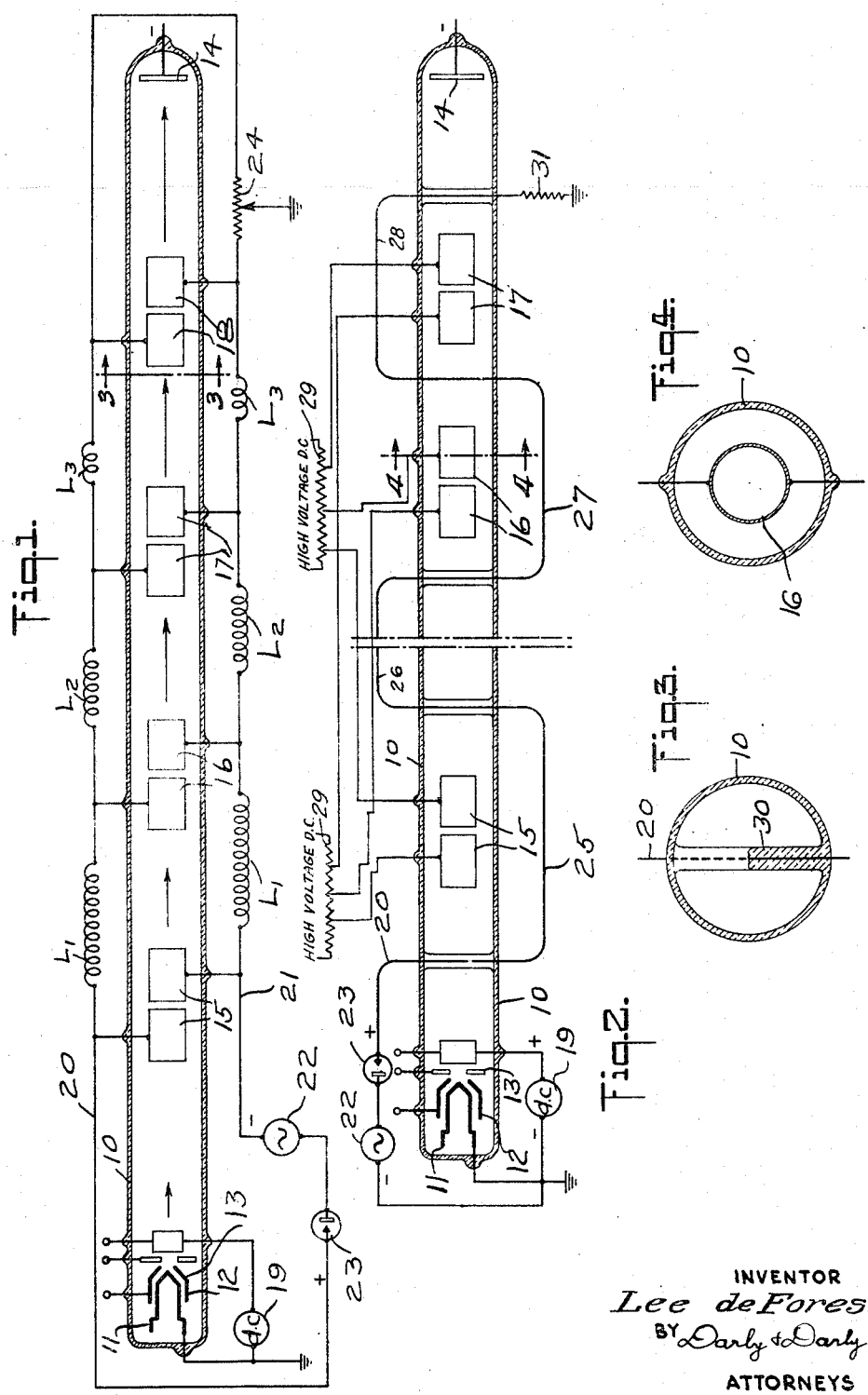
INVENTOR
*Lee de Forest*
BY *Darly & Darly*
ATTORNEYS Nov. 22, 1949  L. DE FOREST  2,489,082
HIGH-VOLTAGE GENERATOR
Filed July 1, 1944  6 Sheets-Sheet 2
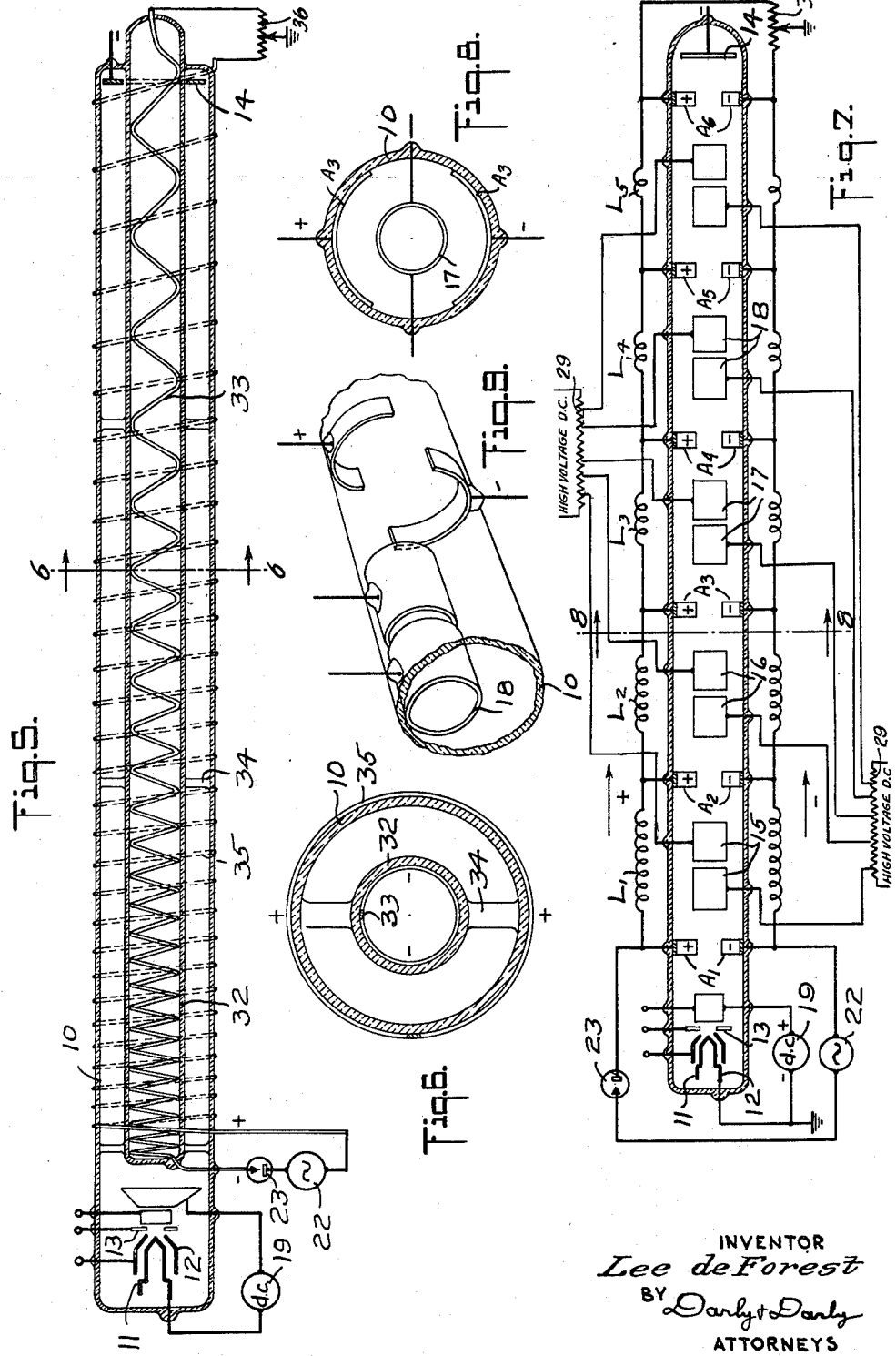
INVENTOR
*Lee deForest*
BY *Darby & Darby*
ATTORNEYS Nov. 22, 1949  L. DE FOREST  2,489,082
HIGH-VOLTAGE GENERATOR
Filed July 1, 1944  6 Sheets-Sheet 3
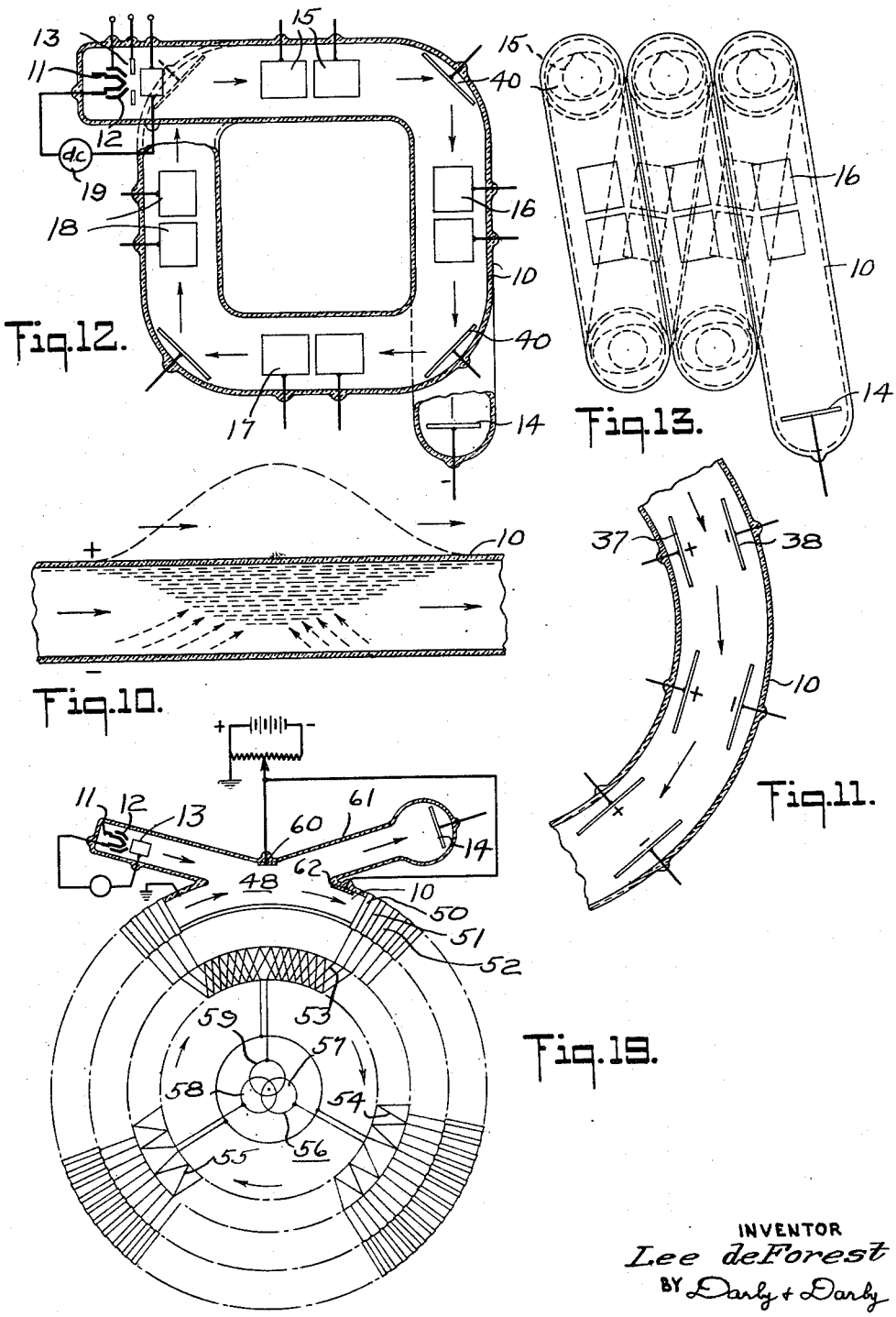
INVENTOR
Lee deForest
BY Darby & Darby
ATTORNEYS Nov. 22, 1949     L. DE FOREST     2,489,082
HIGH-VOLTAGE GENERATOR
Filed July 1, 1944     6 Sheets-Sheet 4
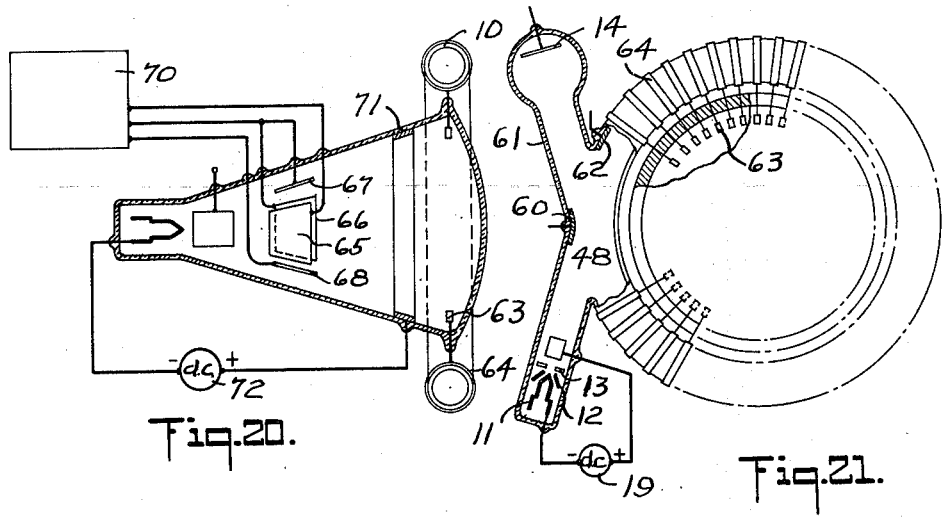
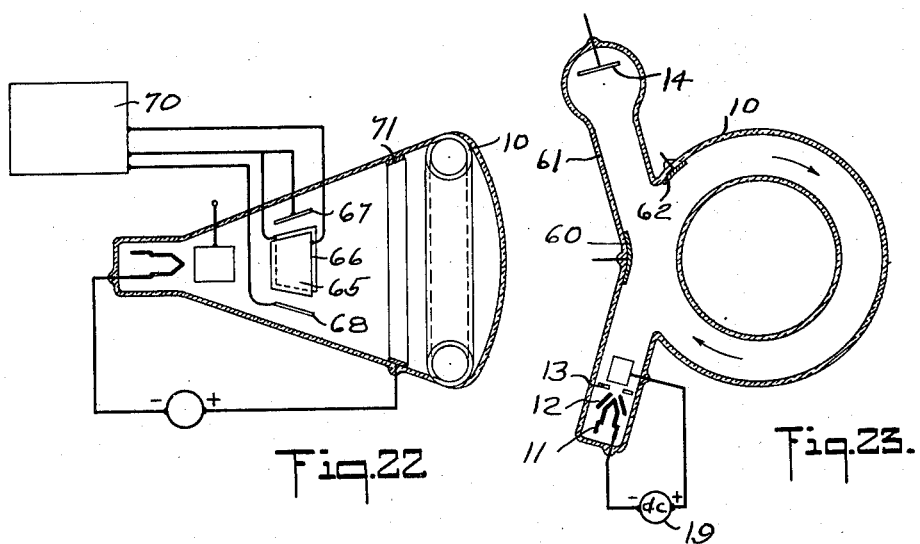
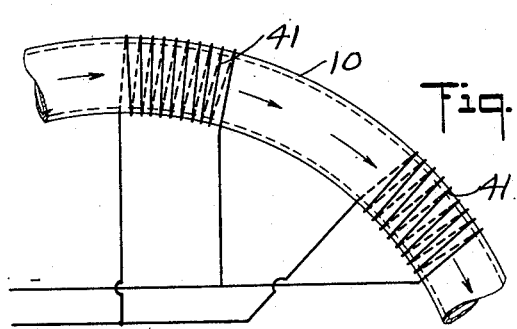
INVENTOR
*Lee deForest*
BY *Darby & Darby*
ATTORNEYS Nov. 22, 1949  L. DE FOREST  2,489,082
HIGH-VOLTAGE GENERATOR
Filed July 1, 1944  6 Sheets-Sheet 5
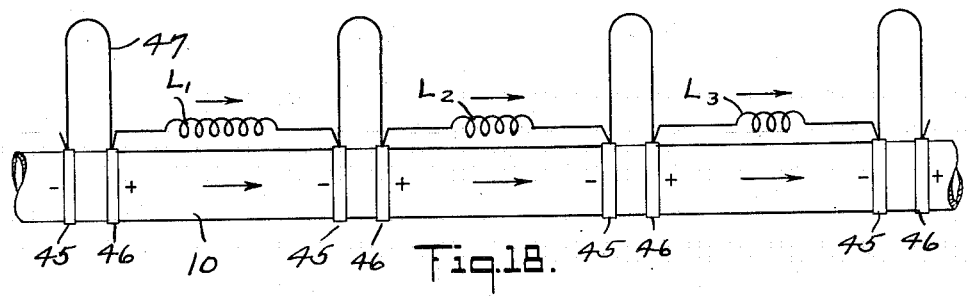
Fig.13.
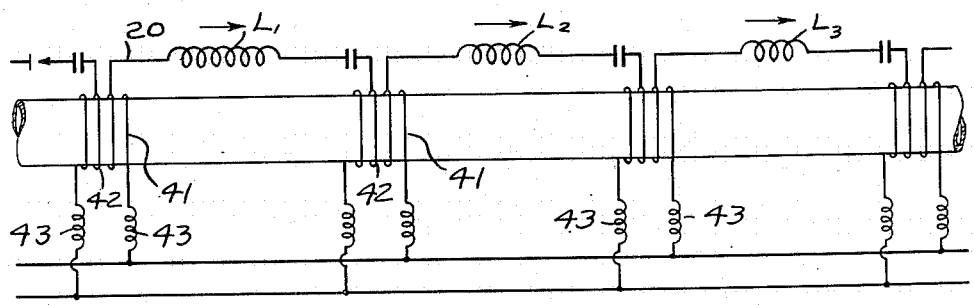
Fig.15.
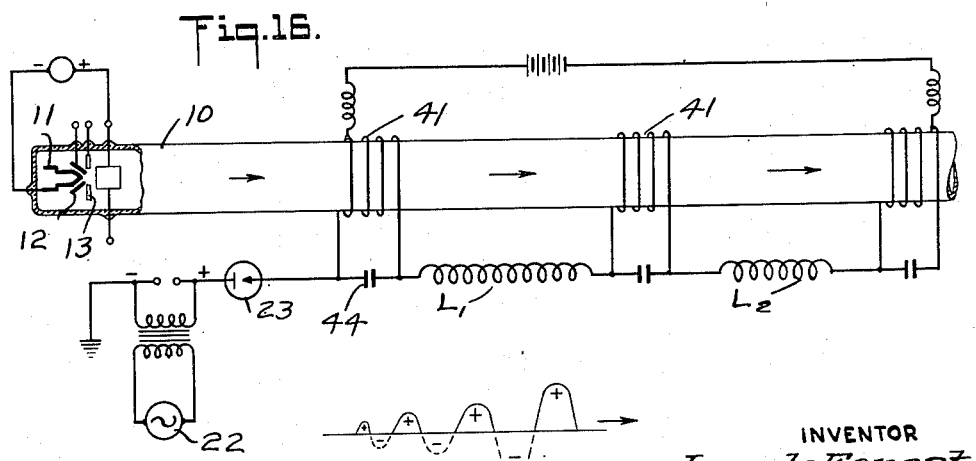
Fig.16.
Fig.12.
INVENTOR
*Lee deForest*
BY *Darly + Darly*
ATTORNEYS Nov. 22, 1949  L. DE FOREST  2,489,082
HIGH-VOLTAGE GENERATOR Filed July 1, 1944  6 Sheets-Sheet 6

INVENTOR
*Lee deForest*
BY *Darby & Darby*
ATTORNEYS

Patented Nov. 22, 1949

2,489,082

UNITED STATES PATENT OFFICE 2,489,082

HIGH-VOLTAGE GENERATOR

Lee de Forest, Los Angeles, Calif.

Application July 1, 1944, Serial No. 543,155

6 Claims. (Cl. 315—15)

The present invention relates to improved and novel methods for the generation of exceedingly high electrical voltages. More particularly the invention comprises apparatus and methods for attaining exceedingly high voltages by causing an electron stream or group of electrons to travel in an evacuated space at speeds approaching that of light. More particularly still the invention accomplishes the generation of such high voltages without the use of heavy magnetic fields.

In general I generate such high voltages by causing a travelling electromagnetic wave or transient to acquire ever increasing velocities and causing a group of electrons to follow the travelling wave, these electrons being preferably generated by use of an "electron gun."

It is an object of my invention to provide apparatus and methods for obtaining exceedingly high electrical voltages.

It is another object of my invention to generate such high voltages by causing an electron stream to travel with increasing velocity through an evacuated space, the increasing velocity being induced by means of a travelling wave travelling along conductors parallel to the electron path, the travelling wave having ever increasing velocity.

It is a further object of my invention to utilize apparatus which does not require high magnetic fields or the use of exceedingly cumbersome and heavy apparatus for the production of such fields.

Further objects and features of my invention will appear when the following description is considered in connection with the annexed drawings in which, Figure 1 is a schematic diagram of one form of my invention showing an electron gun in a long evacuated tube and having arranged exteriorly thereof a Lecher pair along which the travelling wave or transient progresses;

Figure 2 is a schematic circuit diagram of another form of my invention in which the transient travels along a single conductor;

Figure 3 is a cross-sectional view of the tube of Figure 2, the section being taken on the plane of the line 3—3 of Figure 2;

Figure 4 is another cross-sectional view of the tube of Figure 2 showing particularly the location of the electron lenses with respect to the tube. This figure is taken on the plane of the line 4—4 of Figure 2;

Figure 5 is another form of my invention in which the transient waves are impressed upon helically wound conductors coaxially of the tube;

Figure 6 is a cross-sectional view of the tube of Figure 5 showing particularly the mode by which the inner and outer walls of the annular tube are connected by means of insulating supports;

Figure 7 is a further form of the apparatus of my invention in which the conductors on which the transient wave is impressed are conducted to electrodes within the tube;

Figure 8 is a cross-sectional view of the tube of Figure 7 taken on the plane of the line 8—8 of that figure and showing particularly the arrangement of the electrodes and electron lenses within the tube;

Figure 9 shows a modification of the arrangement of electrodes and electron lenses of Figures 7 and 8 in which these elements are placed off center rather than coaxially with the tube;

Figure 10 is a diagram illustrating the wave form of the transient potential over a limited length of the tube. This diagram also shows the accumulation of electrons along one of the walls of the tube resulting from the applied potential;

Figure 11 illustrates an arrangement of electrodes in a curved tube by virtue of which the beam of electrons is deflected and caused to follow a path which is essentially curvilinear;

Figures 12 and 13 are respectively plan and sectional views of a modification of the device shown in the preceding figures in which the elongated tube has been coiled into a generally helical form the helix having straight sides. These figures show reflecting electrodes which are arranged at the corners of the helix to cause the electron stream to follow an essentially helical path;

Figure 14 illustrates an arrangement for magnetically focusing the electron beam and causing it to follow a desired path which is, in the illustration, a circular one;

Figure 15 illustrates the electron tube of my invention in which the focusing electrodes have been replaced with magnetizing coils such as those of Figure 14. It is to be noted that in this figure, portions of the magnetizing coils serve also as acceleration electrodes acting directly upon the progression of the electron stream within the tube;

Figure 16 shows an arrangement generally similar to Figure 15 in which, however, the magnetizing coils are connected in series with the several delaying coils of the transient conductor;

Figure 17 illustrates a wave form which may be utilized instead of the single "hump" or peak of positive polarity. This wave form is a strongly damped one;

Figure 18 illustrates schematically a mode of utilizing both the repulsive effect of the negative half cycle of a damped wave train, such as that of Figure 17, and the attractive effect of the positive half cycles of the wave form whereby the electrons are caused to travel along the tube in bunches;

Figure 19 illustrates a modification of my invention in which the exhausted glass tube is arranged in circular form having tangential branches and in which the initial straight portion of the tube contains the electron gun and the terminating straight portion contains the target or collecting electrode. In this arrangement a multiphase generator feeds a compound toroidal winding to impart to the electrons increasing velocities.

Figure 26:
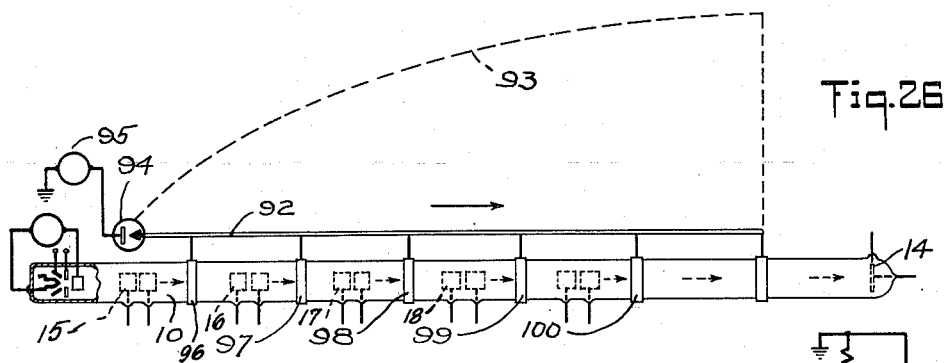
Figure 24:
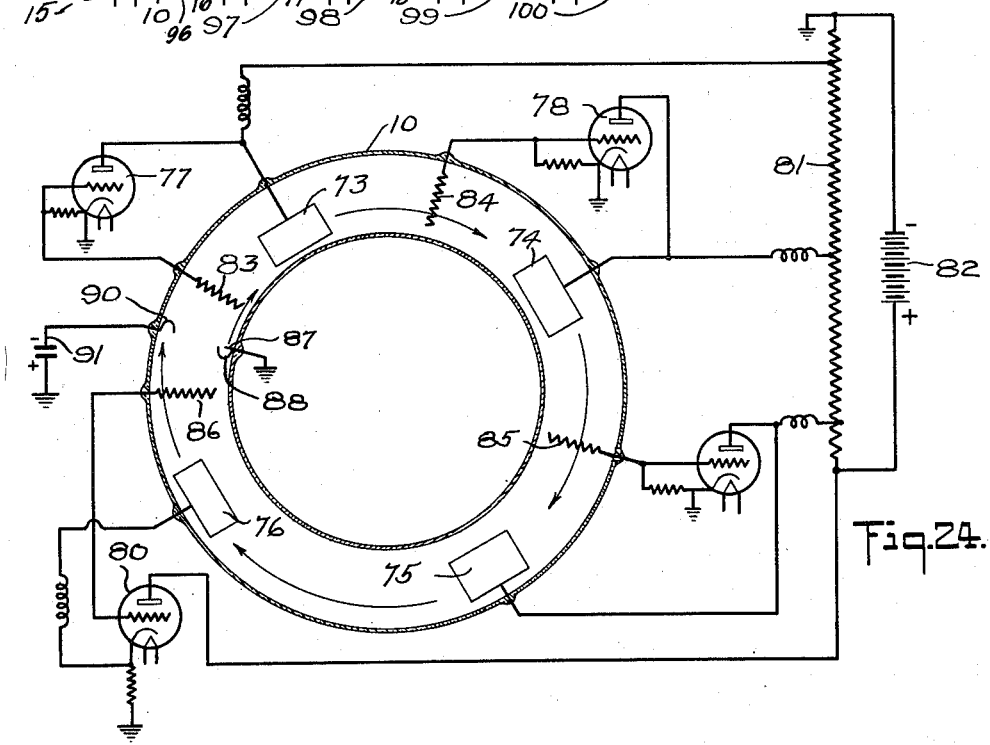
Figure 25:
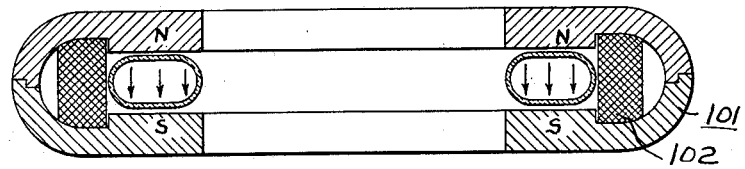

Figures 20 and 21 are respectively, transverse sectional and front views of an apparatus generally similar to that of Figure 19 except that the multiphase toroidal winding is replaced by a cathode ray tube, the beam of which sweeps in a circular path over a series of contact electrodes to thereby impart voltages to the tube to attract the electrons therein at ever increasing velocities;

Figures 22 and 23 are respectively, transverse sectional and front elevations of apparatus generally similar to that of Figures 20 and 21 except in this instance the cathode ray beam acts to directly impart the increasing velocities to the electrons within the tube rather than through the medium of the contact electrodes of Figures 20 and 21;

Figures 24 and 25 illustrate, respectively, a schematic circuit diagram and cross-sectional view of apparatus according to my invention in which the electrons follow a circular trajectory at constant increasing velocities. In this instance the electron tube is located within a toroidal electro-magnetic structure whereby lines of magnetic force traverse the flattened toroidal tube in a direction perpendicular to the flattened faces of the tube. Likewise these figures and particularly Figure 24 illustrate the use of grid structures to act in combination with the electrode structures as triodes to bring about the increasing velocities of the electrons; and Figure 26 illustrates an arrangement by virtue of which a standing wave is utilized to bring about the acceleration of the electron beam.

Referring now to Figure 1, there is illustrated an elongated evacuated tube 10 at one end of which there is an electron gun, comprising a cathode 11 heated to incandescence, a controlling grid structure 12 and a focusing lens 13, for ejecting the electrons from the cathode in the form of an essentially parallel beam. The direct current energizing source for the electron gun or cathode beam gun is shown schematically at 19. At the other end of the glass tube 10 there is located a target or collecting electrode 14. At definite intervals along the length of the tube there are additional electron lenses 15, 16, 17 and 18 which correct the tendency of dispersal of the electrons from a parallel beam as they progress along the tube and, in addition, serve as acceleration electrodes to which are applied seriatim the high voltages of the pulse or transient. The electron lenses 15, 16, 17, 18, etc., are provided with progressively high D. C. potentials which are derived from potentiometers 29 connected across a suitable high voltage source (see Figures 2 and 7).

Extending exteriorly of the tube and parallel to the axis thereof there are a pair of conductors 20 and 21 on which the controlling transient generated by the generator 22 is impressed, there being in series with this generator a rectifier 23 so that only the positive pulses are applied to the conductor 20. In each of the conductors 20 and 21 there are series connected coils generally designated L1, L2 and L3, the purpose of which is to diminish the velocity of propagation of the transient along the parallel conductors. Inasmuch (as is indicated in the drawing) the inductance of the first coil is greater than that of the second which in turn is greater than that of the third, etc., it will be clear that the transient velocity will increase as it progresses along the twin conductors.

If it is assumed that the velocity of the electron stream originating at the electron gun, comprising the elements 11, 12 and 13, is too small to permit it to follow the travelling positive charge impressed upon the accelerating electrode 15, then it will be apparent that the retardation or delay coils L1, L2, etc. retard the progress of the transient to such an extent that the slow moving electrons at the left hand end of the tube can begin to travel at a lower velocity and can be gradually accelerated to keep up with the rate of progress of the transient. As the electron group thereby acquires higher velocities it will be enabled to travel along with the advancing transient at higher and higher velocities until finally an electron velocity approaching that of light has been acquired.

Inasmuch as the electron voltage developed in a travelling electron is proportional to the velocity of the electron, very high voltages will be delivered to the collector plate 14 when electrons travelling at a speed approaching that of light strike the collector plate.

Where non-relativity velocities of an electron are involved the equation correlating the velocity $v$ with the electron rest mass $m_0$, the electron charge $e$ and the acceleration voltage V is:

$$v = \sqrt{\frac{eV}{150 \cdot m_0}}$$

as given by the law of conservation of energy. This equation has been checked experimentally. In accordance with this formula an accelerating voltage of 20,000 results in a non-relativity electron velocity of $84.1 \times 10^6$ meters per second; that of 100,000 volts in a velocity of $188.0 \times 10^6$ meters per second, the latter as compared with an actual velocity of $164 \times 10^6$ meters per second.

Also an accelerating voltage of one million gives an actual velocity of $282 \times 10^8$ meters per second, or $14/15$ that of light. (It is to be noted that the discrepancies above indicated are due to the increase of the mass of the electron occurring with its increase in velocity.)

Therefore, it is seen that if the electron is accelerated to such velocities as above listed, corresponding values of electron volts V will be generated at the collecting electrode 14 of the accelerating system.

In Figure 1 I have shown the electron lenses 15, 16, 17 and 18 each comprising two cylindrical elements having different voltages impressed thereon, the second elements of the various lenses being connected to the negative conductor 21 while the first elements are connected to the positive conductor 20. However, this arrangement is not essential and the second conductor 21 may be entirely removed from contact with the lens elements within the tube which may be charged at proper potentials from a separate source of direct voltage. In fact, these electron lenses are shown as consisting of two elements primarily because such collimating electron lenses are customarily so shown.

As stated above, I provide at 23 a rectifier the purpose of which is to insure that only a positive impulse or surge will travel along the upper conductor 20.

In such an arrangement as here shown, it is essential that the far end of the parallel conductor system comprising the conductors 20, 21 be terminated in a critical terminal resistance the value of which is so chosen as to insure against any reflection of the electromagnetic wave from the far end of the conducting system, since it is preferable that standing waves not be set up in the system. The mid point of this critical terminal resistance 24 may, if desired, be grounded and is so shown in Figure 1.

From the above, it will be clear that electrons emitted from the electron gun are induced by the travelling wave as applied to the accelerating electrodes 15 through 18 to travel at increasing velocities down the length of the tube 10 which is relatively very long and to ultimately strike against the collecting electrode or target 14. Since at the time of striking the target the electrons have acquired exceedingly high velocities, it follows from the discussion hereinabove that the voltage derived from the target circuit is an extremely high one.

Figure 2 shows a system essentially the same as that of Figure 1 in which, however, a single conductor 20 is supplied rather than the two conductors 20, 21. The conductor 20 is provided with relatively large loops 25, 26, 27 and 28 between the several points at which the conductor makes contact with the glass tube 10. As shown in Figure 2, the conductor 20 actually passes diametrically through the glass tube 10 but is insulated therefrom by a glass sleeve 30 so that the electron stream cannot come in direct contact with the conductor 20. The glass sleeve is welded at either end to the wall of tube 10, as is shown particularly in Figure 3.

The arrangement of the loops 25, 26, 27 and 28, as shown in Figure 2, accomplishes the same purpose as is accomplished by the coils L1, L2 and L3 of Figure 1, that is, they serve, by virtue of the fact that they penetrate the glass tube 10 at shorter and shorter intervals (as measured along the conductor), to increase the speed of the transient advancing along the axis of the glass tube, thereby enabling the electron groups to gradually acquire greater and greater velocities along the axis of the tube. In the showing of Figure 2 the surge conductor 20 is shown as terminating in a resistance element 31 in order to prevent any reflection at the grounded terminal and the negative terminal of the surge generator 22 is grounded. In both the showings of Figures 1 and 2 the surge generator 22 may be in the form of a simple spark gap which generally is arranged in series with the high voltage rectifier so that only the positive impulses can travel from the generator to the earthed or grounded terminal.

The position of the electron lenses coaxially of the tube is illustrated in Figure 4. This position is the same for the lenses of Figures 1 and 2.

Another mode for applying the voltages of a transient to the electron stream flowing within an exhausted glass tube is illustrated in Figure 5. In this figure the exhausted space comprises an annular ring between two coaxial glass tubes 10 and 32, the electron stream travelling down the annular space so provided. Within the interior of the smaller tube 32 there is located a helical coil 33 of gradually diminishing inductance represented by the gradual lessening of the number of turns per unit of axial length as the helix progresses from left to right as seen in Figure 5. The two tubes 10 and 32 are joined by the insulating glass spools 34 (see Figure 6) which extend through the annular space from the exterior wall of tube 32 to the interior wall of tube 10.

In a manner similar to the arrangement of the helical coil 33 within the small tube, a large helical coil 35 is wound around the outside of the large tube 10, this coil likewise having constantly diminishing impedance as it progresses from left to right. The impedance per unit of axial length of the coils 33 and 35 are equal so that the two transients of opposite polarity travelling along the two helically coiled conductors will maintain the same velocity as they progress from left to right. In the arrangement shown in this figure, I prefer to have the positive surge travel along the external conductor 35 and the negative surge travel along the inner conductor 33.

It may be mentioned that the electron gun comprising the parts 11, 12 and 13 is in this arrangement so designed as to direct the electrons toward the annular space separating the tubes 10 and 32 so that they will travel through that space. In a similar manner the collector plate 14 is ring-shaped and extends only throughout the annular space. Further, with respect to this figure, it should be noted that the inner conductor 33 is brought out through a glass seal at the righthand end of the inner tube 32. Likewise it should be noted that the ends of the two helices 33 and 35 are joined together and connected to ground through the critical terminal resistance 36 which is analogous to the resistances 24 and 31 of the prior illustrations.

In any of the embodiments thus far described, it may at times be desirable to deposit on the interior surface of the outer glass tube 10 a thin coating of graphite or aquadag so as to render this surface slightly conducting although not sufficiently conducting to interfere with the electrostatic attraction between the positive charge on the outer helix and groups of electrons accumulated along the inner surface of the outer tube. Such a high resistance coating may be grounded or earthed either directly or through a high resistance conductor.

As stated above both helices possess the same inductance per unit of axial length and this inductance decreases as the helices progress from left to right so that the transient wave travels with increasing velocity from left to right down the length of the tube finally approaching that of light at the right hand terminal or collecting plate 14.

The frequency of the alternating current or transient wave applied to the two conductor channel comprising the conductors 33 and 35 should be sufficiently high or its wave shape such that its space-potential gradient is sufficiently steep so that an appreciable "space urge" exists at all times in the neighborhood of an electron or group of electrons to cause the forward movement of the latter in the direction of travel of the electro magnetic wave (or of the field of force of said wave) along the conductor.

Obviously the frequency of the wave or transient must not be so great that the impedance of the helices at the origin is so large as to offer great impedance to the passage of the transient or voltage surge. A frequency of one or a few megacycles is optimum although much higher frequencies may be used.

In the arrangements heretofore described, the electrons will be attracted in the arrangement of Figures 5 and 6 towards the outer regions of the annular space through which they travel. Great quantities or clouds of electrons will cluster on the interior wall of the outer tube attracted there by the positive potential of the transient on the outer helix until the accumulated space charge prevents further accumulation upon this outer wall. Thereafter the further emitted electrons will travel down the medial sections of the annular space impelled by the attraction exerted by the positive charges in the outer helical conductor as the wave advances thereon.

Although it is preferable to use the inner helix 33 and the smaller glass tube 32, these may be omitted and a single conductor 35 employed alone. In this case the circuit arrangement would be similar to that shown in Figure 2.

Another mode of accomplishing the same results is illustrated in Figure 7 which differs from Figure 1 in that from point to point along the two conductors conveying the positive and negative transients, connections are made to curved accelerating electrodes $A_1$—$A_5$ which may be either within or without the glass tube 10. Their position when sealed within the tube 10 is shown in Figure 8. Furthermore, in Figure 7 there is shown a series of electron lenses 15, 16, 17 and 18, etc., similar to those of Figure 1.

The electron lenses above mentioned may be displaced toward the side of the tube which carries the positively charged segments and such an arrangement is illustrated in Figure 9.

The purpose of utilizing electron lenses displaced toward the conductor or segments carrying the positive charge is illustrated by reference to Figure 10 in which there is shown a longitudinal section of the glass tube having outlined above it a curve of positive ultra high frequency transient potential and in which there is shown within the tube a corresponding accumulation of electrons. It is seen by reference to this figure that the electrons from the lower side of the glass tube have been attracted away from the tube into the neighborhood of the upper portion thereof by virtue of the location thereat at the instant of the positive voltage transient.

It should be noted in connection with the foregoing discussion that the elongated glass tubes 10 referred to are preferably of the order of three meters or more in length and from five to 10 centimeters in diameter.

In order to diminish the space requirements, it is entirely possible to arrange the elongated glass tube 10 as a portion of a circle. A fragmentary view of such a tube is shown in Figure 11 and in this instance pairs of electrodes 37, 38 are provided at intervals along the tube, one member of each pair being connected to a source of one polarity and the other member to a source of the opposite polarity. By means of this arrangement the beam of electrons which tends to follow a straight path is deflected as it passes between the two plates of a pair and caused to progress in a direction at an oblique angle to its original direction. Thus such a disposition of the electrodes will cause the electron stream to follow an essentially curvilinear path. These plates 37 and 38 may be connected in the circuit in the same manner as are the curved plates of Figure 8 and may be interspersed with the electron lenses (not shown in Figure 11).

Still greater economy of space may be secured by bending the elongated tube 10 into a helical form. Thus in Figures 12 and 13 I have shown a generally helical tube 10 having straight sides and in which reflecting electrodes 40 located at the corners, together with electron lenses 15, 16, 17, etc., located between each two reflectors, serve to force the electron stream to follow an essentially helical path as it travels at constantly accelerated velocity from the electron gun 11, 12, 13 to the final high voltage collector terminal 14. It is obvious that by means of deflecting or baffle plates, arranged as shown in Figure 11, such a helical structure may be of cylindrical rather than square form. In either event the maximum dimensions of the system are much condensed.

In the above descriptions I have utilized electrostatic methods for focusing the electron beam. However, this beam may equally well be magnetically focused. In Figure 14 I have illustrated such a means for focusing the electron stream, this being accomplished by winding coils 41 of an appropriate number of turns around the glass tube at proper locations thereon. These coils are connected to a source of direct current supplied, as indicated in Figure 14, for the purpose of producing the desired magnetic flux along the direction of the axis of the glass tube.

While Figure 14 shows the arrangement of magnetizing coils to cause the electron stream to travel in a curvilinear path, it will be obvious that such magnetizing coils may be utilized with a straight tube. Thus in Figure 15 there is shown an arrangement wherein one or more turns of the magnetizing coils are inserted in the transient conductor whereby that portion of the magnetizing coil here designated 42 serves also as an acceleration electrode acting directly upon the progression of the electron stream within the tube. These magnetizing coils 41 are connected to a bus bar supply of direct current through radio frequency choke coils 43, the purpose of which is to prevent dissipation of the transient wave into the direct current supply conductors.

In Figure 16 there is shown an arrangement generally similar to that of Figure 15 in which, however, the magnetizing coils 41 are connected in series with the several delay coils as $L_1$, $L_2$, $L_3$ of the transient inductor. Each magnetizing coil 41 is here shown as bridged by a small condenser 44 which offers no impedance to the progression of the transient. This arrangement, however, as well as the arrangement of Figure 15 has the disadvantage that parasitic reflections of the transient may occur owing to the sudden variations in the inductance and capacity parameters of the transient conductor.

It will be clear that instead of depending upon or utilizing a single transient "hump" or peak of positive polarity, I may use a strongly damped transient wave train such as that illustrated in Figure 17. In Figure 17, the dotted negative portions of the wave indicate that such negative portions may be omitted when a rectifier is utilized. If, however, a rectifier is not utilized and the entire damped wave is present advantage may be taken of this condition to utilize the repulsive effect upon a bunch of electrons exercised by the negative peaks of the transient wave train. Such repulsive effects may then be utilized to drive the bunches of electrons ahead of those negative portions of the wave train at the same time that they are being attracted forward by the preceding positive halves of the wave train. This causes the electrons to travel along the tubes in bunches.

Thus there is shown in Figure 18 an arrangement in which the accelerating electrodes, here designated as 45, 46, are arranged in pairs, the units of which are separated by a looped conductor 47. All of these looped conductors are of the same length or of the same inductance and are so designed that when the positive peak of a high frequency damped transient wave train arrives at the electrodes 46 the following negative peak of the damped transient wave train has arrived at the next rearward electrode 45. The pairs of electrodes 45, 46 are as before separated by successively diminishing inductance paths $L_1$, $L_2$, $L_3$, etc., described in connection with the preceding figures. As has been stated, such an arrangement of electrodes 45, 46 results in a "bunching" of the electron stream in the exhausted glass tube 10, these bunches progressing at increasing velocity as the accelerating transient progresses along the increasingly "fast" conductor.

Referring now to Figure 19, I have shown therein a somewhat different arrangement for causing the electron stream emitted from the gun to travel at constantly increasing velocity. In this arrangement the exhausted glass tube 10 is curved in a circular form the two ends thereof, however, being straight and crossing each other in the space designated as 48. The two straight portions of the tube extend tangentially from the common portion at 48. Surrounding the circular portion of the tube is a series of accelerating electrodes designated as 50, 51 and 52 which are arranged in groups of three and which may be situated either within or without the tube. Within the circular space embraced by the tube 10 is a toroidal shaped helix composed of three individual windings 53, 54 and 55 each of which is connected to a terminal of a three-phase radio frequency generator generally designated 56. The purpose of this arrangement is to cause a rotating electromagnetic field to traverse the compound triple helical toroidal winding. For the purpose of simplicity this three-pause generator has been shown as comprising the three collector rings 57, 58 and 59, although I prefer to use a generator comprising three triodes each with its individual oscillator circuit, each such circuit having a 120° phase shift relative to the other two circuits.

As a result of the connections here shown, a rotating electrostatic field is established upon the accelerating electrodes 50, 51 and 52 located as above described either within or surrounding the circularly formed elongated and evacuated tube 10. The electrons emerge at a fairly high frequency from the electron gun comprising the parts 11, 12 and 13 and are projected into the beginning of the circular portion of the tube 10 and are there accelerated by and caused to follow the rotating electrostatic field there existing and shown in Figure 19 as travelling in a clockwise direction. At the point 60 there is located either within or without the glass tube a negatively charged electrode, the purpose of which is to prevent the accelerated electron stream as it emerges from the left or gun end of the tube from entering into the straight terminal prolongation 61 of the tube. At 62 there is located a second negatively charged repelling electrode. As a result of the repulsive action of these two electrodes 60 and 62, the electrons after having traversed the circular portion of the tube 10 are caused to again enter this circular portion and to follow in a clockwise direction the rotating electrostatic field. This action continues due to the repulsive effect of the electrodes 60 and 62. Such an arrangement would result simply in the rotation of the electrons through a circular tube at a high but constant velocity. However, to increase this velocity the three-phase radio frequency generator is periodically frequency modulated from a relatively low to a relatively high frequency. Through this increasing cycle of frequency the electrostatic field propelling the electrons rotates at an ever increasing velocity giving to the electrons or group of electrons an exceedingly high final velocity. The rotation of the electrons through the toroidal tube will continue at an accelerated pace as long as the frequency of the impelling three-phase generator continues to increase. Before the limit of this increase is attained the centrifugal force of the electrons as they pass through the space 48 becomes so great that the electrons instead of again entering into the circular portion of the tube overcome the repulsive action of the electrodes 60 and 62 and enter the terminal tangential section 61 thereby finally reaching the high velocity collecting electrode 14.

Thereafter the frequency of modulation of the three-phase radio frequency generator is caused to diminish to its initial relatively low value. During the period of diminishment of the frequency of the generator such electrons as are in the circular portion of the tube are decelerated. Furthermore, during this period no more high velocity electrons will enter the cross-over space 48. Since the modulating frequency is next again increased and since this decrease and increase repeats itself periodically, there results an acceleration of the electrons within the circular tube and a delivery of a pulse of very high voltage to the collector plate 14 many times during each second. While the stream of electrons is entering the space 48 this stream acts as a "buncher" to cut off any further egress of the cathode electrons into the toroidal tube until the whirling bunch of electrons has been expelled into the tangential space 61 as described. Thereafter the cathode electron stream will recommence and the above described action be repeated with each cycle of frequency modulation of the three-phase generator.

It will be clear that rectifiers may be provided in each of the three conductors leading from the three-phase generator to the compound winding so that only positive impulses will be applied to the three groups of electrodes thus impelling the electron stream forward around the toroidal tube.

In place of the three-phase generator arrangement above described in connection with Figure 19, the same results may be obtained by the employment of a cathode beam caused to sweep in a circular path over a series of contact electrodes. Such an arrangement is shown in Figures 20 and 21. In these figures there is shown a cathode ray tube arranged so that the cathode beam sweeps in a circular path over a series of contact electrodes which are arranged at the window end of the tube, as shown at 63, and the leads from which extend from the seal between the domed portion of the tube and the funnel-shaped portion thereof. These leads extend to the tube electrodes 64 similar to those described in connection with Figure 19. In this instance the action upon the electron group or bunch is one of repulsion, the electrons from the cathode ray tube pushing or repelling the flock of electrons generated by the electron gun in the tube 10 ahead of them.

In order to cause the cathode beam to sweep in a circular path as described, the four deflecting plates of the cathode ray tube 65, 66, 67 and 68 are connected in a well known manner by means of three conductors to the terminals of a two-phase frequency modulated radio frequency generator 70. The frequency of modulation of this generator ranges from the order of ten kilocycles to one megacycle. The cathode beam tube is equipped with the usual collector ring 71 which is connected to a source of positive potential 72, the negative terminal from which leads to the cathode of the tube. The purpose of this collector ring as is well known is to collect the diffused electrons after they have struck the target at which the cathode beam is directed.

The arrangement just described may be further simplified by sealing the circular portion of a tube such as that described in connection with Figures 20 and 21 within the cathode beam tube itself so that the cathode beam will sweep over the surface of the toroid propelling the electron flock by repulsion within the toroid in advance of the end of the sweeping cathode beam. Such an arrangement is shown in Figures 22 and 23 in which the same reference characters have been utilized as were utilized in connection with Figures 20 and 21.

Referring now to Figures 24 and 25, there is there illustrated still another method of causing the electrons to follow a circular trajectory at constantly increasing velocities to thereby attain very high voltages. In these figures the circular highly exhausted glass tube 10 is preferably made of a flattened cross-section as is indicated particularly in Figure 25. The tube 10 is located within a toroidal electrical magnet structure 101 whereby the lines of magnetic force traverse the flattened toroidal tube in a direction perpendicular to the flattened faces of the tube. The north and south poles of this magnet are circular in form and lie closely adjacent to the flattened surfaces of the toroidal tube as is clearly shown in Figure 25. The magnetizing coil is located within the magnet housing and is shown in cross-section at 102. At various positions around the toroidal tube there are located accelerating electrodes 73, 74, 75 and 76 (see Figure 24). The first three of these plates 73, 74 and 75 are connected each to the plate electrode of one of the triode tubes 77, 78, 79 and 80 and, likewise, through radio frequency choke coils to points upon the voltage divider 81. Due to this arrangement, increasingly high potentials are applied to the accelerating electrodes 73, 74, 75 and 76. Although in the drawing the source of high voltage is indicated as a direct current supply 82, it will be understood that an alternating current supply may be substituted.

Extending transversely across the toroidal tube are four grid structures, designated 83, 84, 85 and 86, and at a point near the interior circumference of the toroid there is arranged in a protecting cap 87 a cathode 88 which is the source of the electron supply. Electrons which are ejected from 88 are caused to follow a circular path due to the action of the transverse magnetic field set up by the magnet 71. The positive charge which is applied to the first accelerator electrode 73 will attract the electrons toward that member. However, in passing through the grid structure 83, the momentary potential upon 73 is greatly increased due to the well known action of the triode 80 to the grid of which the grid structure 83 is connected. The increased velocity thus acquired by the electron group will cause the group to pass beyond the electrode 73 towards the electrode 74. When the electrons strike the grid structure 84 a still higher positive potential is applied to the accelerating electrode 74 by virtue of the action of the triode 78. The electrons, therefore, will progress with still higher velocity through the grid structure 85 thereby causing a still higher positive potential to be applied to the accelerating electrode 75 due to the action of the triode 79.

Were this same arrangement of grid structures alternating with accelerating electrodes continuing all the way around the toroidal tube, there would be at the end of an orbital cycle electron groups passing from a high voltage electrode to one of much lower voltage, that is, from electrode 76 to electrode 73. This arrangement would consequently act to decelerate the electrons.

By reversing the arrangement on the last accelerating electrode 76 and last grid structure 86, the electrons striking the latter and thereby causing a sudden interruption of the plate current through the triode 79 will build up a very high negative potential upon the cathode of that tube which cathode is connected to the accelerating electrode 76. There results a sudden application of a very high negative potential to the plate 76 thereby giving the electrons of the group a strong repelling force which causes them to continue on at an accelerated pace into the initial portion of the toroidal tube and to again strike the grid structure 83. Thereafter the step by step accelerations of the electrons by the positively charged electrodes 73, 74, 75 will be repeated notwithstanding the fact that each cycle again starts with lower accelerating voltages, since, although these voltages are lower, they are nevertheless each progressively of a higher voltage than the one preceding it. Thus the action is one of acceleration and, therefore, adds to the existing velocity of the electron group up to the point where the electron velocity becomes such that transient times in the several triodes begin to enter into the situation. Thereafter the above described successive accelerations would no longer be effective and might even become decelerations. Before this stage is reached, the centrifugal force acting on the electron group will have caused its egress into the curved collector plate or receptacle 90 which is mounted near the exterior surface of the tube as is indicated in Figure 24. Following this a new group of electrons emerging from the cathode 88 will begin a similar cycle of acceleration. These cycles, being of extremely brief duration due to the very high electron velocity attained, will be repeated many thousands of times per second.

By the means just described, it will be seen that the electrons will be caused to circulate around and around the toroidal tube with continually accelerating velocities. Due to centrifugal force, the trajectory of such groups of electrons is a spiral wherefor the electrons gradually approach the outside surface of the toroidal tube and finally strike the collector electrode 90 having at the time attained an extremely high velocity and producing a corresponding high electron voltage. At 91 there is shown a high tension condenser for collecting successive groups of high voltage electrons which are captured by the collector 90.

It is obvious that such an arrangement as that just described requires that means be provided for discharging the increasingly high negative charges which accumulate upon the grids of the triode tubes, before such accumulated negative charges become sufficient to prevent the penetration by the electrons of the successive grid structures 83, 84, etc. Such means are shown in Figure 24 as high resistance paths from the grids to ground.

The principle of electron acceleration just described does not necessarily involve the use of the triode tubes shown in Figure 24. It may be sufficient merely to connect the successive acceleration electrodes as 73, 74, etc. to appropriate points of increasingly high voltage derived, for example, from a voltage divider such as 81 of Figure 24. In this case the grid structures 83, 84, etc. are unnecessary. The action of the triode 80 together with the associated final grid structure 86 will be retained to cause the application of a sudden high negative potential upon the accelerating electrode 76; this is so since it must be assured that the electron group will pass on after traversing the original circuit and come into sufficiently close proximity to the first positively charged accelerating electrode 73 so that it once more comes under the influence of the positive charge there applied thereby continuing the progress of the electrons around the toroid.

As has been indicated above, in place of the direct current source of increasingly high voltage applied to the accelerating electrodes, an alternating current may be substituted. If a very high frequency alternating current be applied, the frequency may be made such and the successive acceleration electrodes be so connected to a propagation network that a positive charge is first applied to electrode 73 then at the proper interval thereafter to electrodes 74, 75, etc., while a corresponding negative charge will be applied to the electrode next behind that to which the positive charge is at any instant applied. With such an arrangement it is clear that the frequency of the alternating current would be progressively increased so that the positive charges and, of course, the negative charges likewise, are successively applied to the accelerating electrodes at a faster and faster rate in keeping with the increased acceleration of the electron group as the latter circulates around the toroidal tube 10. With such an arrangement utilizing frequency modulated radio frequency supply, the final triode 80 with its grid structure 86 will be unnecessary since the group of electrons will be continually accelerated as it progresses around and around the toroidal tube under the influence of the increasing frequency of the applied alternating voltage.

In place of employing a transient travelling electromagnetic wave in the system and avoiding or preventing the reflection of the wave at the end of the transmission circuit by means of absorption resistance, as mentioned particularly in connection with Figures 1, 2 and 5, I may employ instead a sinusoidal wave form passing the wave through a rectifier which transmits only the positive half waves and transmitting these positive half waves to set up a quarter wavelength standing wave of positive voltage at the end of the transmission line. This results from the fact that reflection occurs at the end of the transmission line. There is consequently built up a persistent gradient of high positive voltage from zero to a maximum, this maximum being double or more the voltage of the wave at its origin by virtue of its reflection at the terminal of the transmission line.

With such an arrangement, the electrons injected into the low voltage region of the standing quarter wave will be propelled by the positive voltage gradient along the evacuated tube in the direction of increase and at a constantly accelerated speed which, if the wave length is not too short and the distance travelled by the electrons not too short, will attain very high values, approaching that of light, with correspondingly high voltage generated when the electrons strike the collector electrode or target located at the remote end of the evacuated tube.

An arrangement in accordance with the above description is shown in Figure 26 in which conductor 92 extends parallel to the evacuated tube 10 and is the locus of the standing quarter wave which wave is shown in dotted lines as indicated at 93 as one quarter of a sinusoidal extending between the rectifier 94 and the high voltage terminal of the system. The alternating current ultra high frequency generator 95 is connected between the rectifier and ground. At appropriate distances along the conductor 92 connections are made to acceleration electrodes 96, 97, 98, 99, 100, which are exactly similar to those described in connection with the previous figures and which are located at spaced intervals along the length of the long exhausted tube 10. At one end of the system is located the cathode beam or electron gun similar to the ones previously described, while at the other end of the tube is located the collector plate 14 against which the repeatedly accelerated high velocity electrons are driven. 14, therefore, becomes the seat of extremely high negative voltage groups of electrons striking it at the rate of one per cycle of the high frequency generator which sets up the standing quarter wave of positive potential along the conductor 92.

It will be clear that the elements considered in connection with Figure 26 may be coiled in the form of a sector of a circle or in a helical form as described heretofore in connection with other forms of the invention in order to condense the over-all space requirements of this embodiment of the invention.

While I have described preferred embodiments of my invention and preferred modes of operation thereof, it will be clear that many other modifications may be made without departing from the scope of the invention. Therefore, I desire that I be limited not by the foregoing description but solely by the appended claims.

What is claimed:

1. A device for generating high electron voltages comprising an exhausted tube of substantial length, means at one end of said tube for generating an electron stream, a metallic conductor extending along said tube and generally parallel thereto, a plurality of accelerating electrodes located at spaced points along the length of said tube, connections from said metallic conductor to said accelerating electrodes, means for applying high frequency high voltage surges to said conductor, and inductances in series with each section of said conductor for initially reducing the velocity of said voltage surges along the conductor, said inductances being of progressively lesser value from the electron generating means to the far end of the tube, whereby the velocity of the voltage surges increases from the electron generating end of the tube to the remote end, and the velocity of the electrons increases correspondingly.

2. A device for generating high electron voltages comprising an exhausted tube of substantial length containing an electron gun structure at one end thereof, an electron collector electrode at the other end of said tube, a series of electron lenses located at points along the interior of said tube for maintaining the electron stream emitted from said electron gun as a beam of narrow cross section, a plurality of electron accelerating electrodes located at spaced points along the length of said tube, a metallic conductor connected to said acceleration electrodes, a generator of high frequency alternating electrical voltages one terminal of said generator being connected to one end of said conductor the other terminal of said conductor being connected to ground and means at the far terminal of said conductor for preventing reflection of said alternating electrical voltages at said terminal.

3. A device for generating high electron voltages comprising an exhausted tube of substantial length, containing an electron gun structure at one end thereof, an electron collector electrode at the other end of said tube, a series of electron lenses located at points along the interior of said tube for maintaining the electron stream emitted from said electron gun as a beam of narrow cross section, a plurality of electron acceleration electrodes located at spaced points along the length of said tube, a metallic conductor connected to said acceleration electrodes, a generator of high frequency alternating electrical voltages one terminal of said generator being connected to one end of said conductor the other terminal of said conductor being connected to ground, and means at the far terminal of said conductor for preventing reflection of said alternating electrical voltages at said terminal, said means comprising a critical resistance connected between said far end of said conductor and ground.

4. A device for generating high electron voltages comprising an exhausted tube of substantial length, containing an electron gun structure at one end thereof, an electron collector electrode at the other end of said tube, a series of electron lenses located at points along the interior of said tube for maintaining the electron stream emitted from said electron gun as a beam of narrow cross section, a plurality of electron acceleration electrodes located at spaced points along the length of said tube, a metallic conductor connected to said acceleration electrodes, a generator of high frequency alternating electrical voltages, a rectifier, a connection from said generator to said rectifier and from said rectifier to one end of said conductor, the other terminal of said conductor being connected to ground, and means at the far terminal of said conductor for preventing reflection of said alternating electrical voltages.

5. A device for generating high electron voltages comprising an exhausted tube of substantial length, a source of electrons located at one end of said tube, a plurality of electron lenses located at selected points along the axis of said tube, a plurality of accelerating electrodes located at points intermediate to the several said electron lenses, a collector plate located at the end of said tube remote from said electron source, and means for progressively applying positive electrical voltages to said accelerating electrodes, whereby groups of electrons are induced to traverse said tube at progressively increasing velocity.

6. A device for generating high electron voltages comprising an exhausted tube of substantial length, means at one end of said tube for generating an electron stream, a plurality of electron lenses arranged within said tube at spaced intervals for causing said electron stream to be maintained as a beam of narrow cross section, a plurality of acceleration electrodes located at spaced points along the length of said tube, connections from said metallic conductor to said acceleration electrodes, and means for applying high frequency high voltage surges to said conductor whereby the surges proceed along the axis of the tube at increasing velocities and electrons under the influence thereof proceed down the tube at increased velocity and acceleration.

LEE DE FOREST.

REFERENCES CITED

The following references are of record in the file of this patent:

UNITED STATES PATENTS

| Number | Name | Date |
| --- | --- | --- |
| Re. 21,739 | Llewellyn | Mar. 4, 1941 |
| 1,981,537 | Allibone | Nov. 20, 1934 |
| 2,064,469 | Haeff | Dec. 15, 1936 |
| 2,074,478 | Linder | Mar. 23, 1937 |
| 2,110,911 | Knoll et al. | Mar. 15, 1938 |
| 2,145,727 | Lloyd | Jan. 31, 1939 |
| 2,163,740 | Wales | June 27, 1939 |
| 2,193,602 | Penny | Mar. 12, 1940 |
| 2,197,338 | Fritz | Apr. 16, 1940 |
| 2,214,871 | Westendorp | Sept. 17, 1940 |
| 2,233,779 | Fritz | Mar. 4, 1941 |
| 2,245,670 | Hollmann | June 17, 1941 |
| 2,266,411 | Clavier et al. | Dec. 16, 1941 |
| 2,299,792 | Bouwers et al. | Oct. 27, 1942 |
| 2,300,052 | Lindenblad | Oct. 27, 1942 |
| 2,407,296 | Skellett | Sept. 10, 1946 |